Patented July 24, 1928.

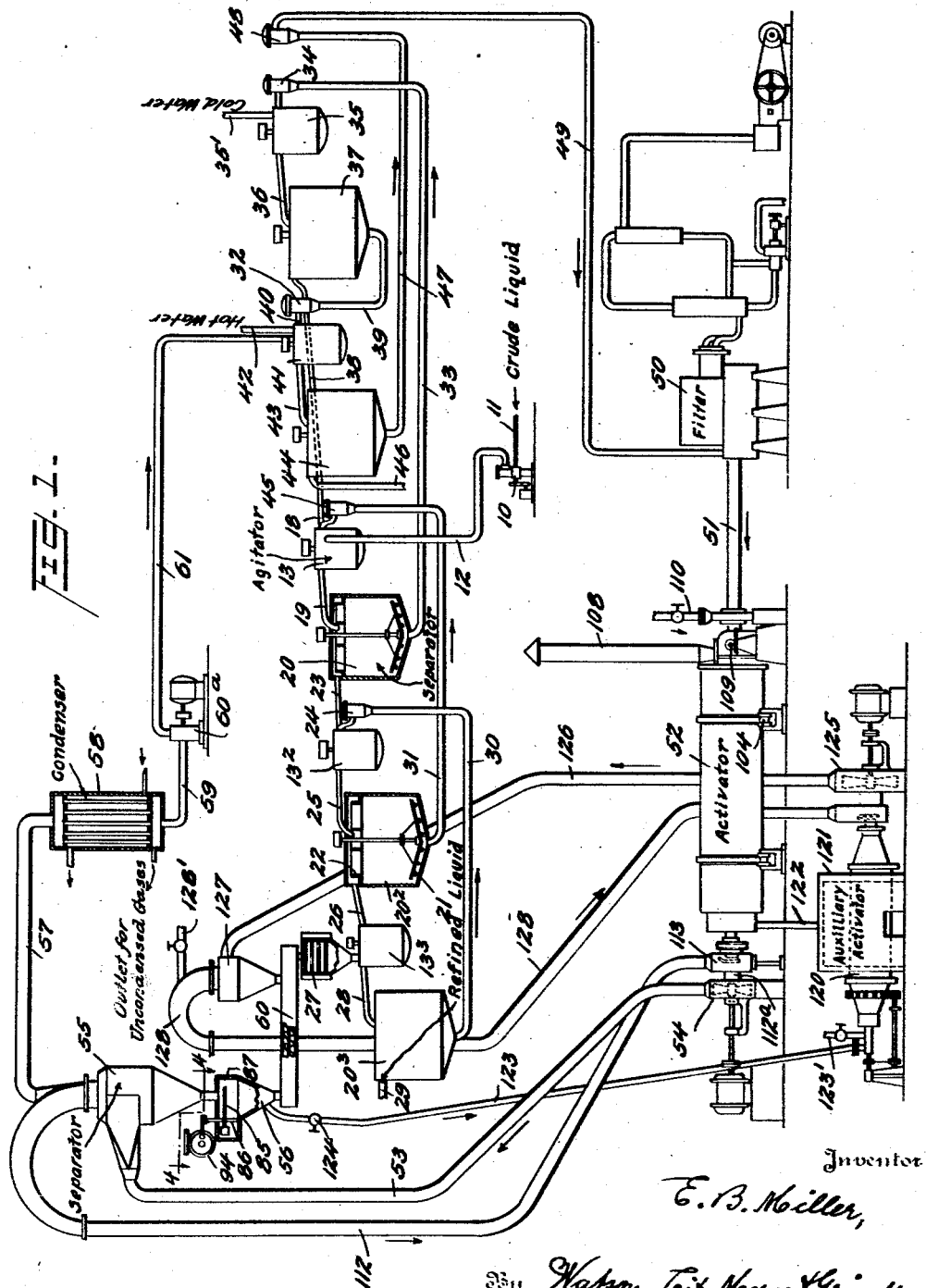

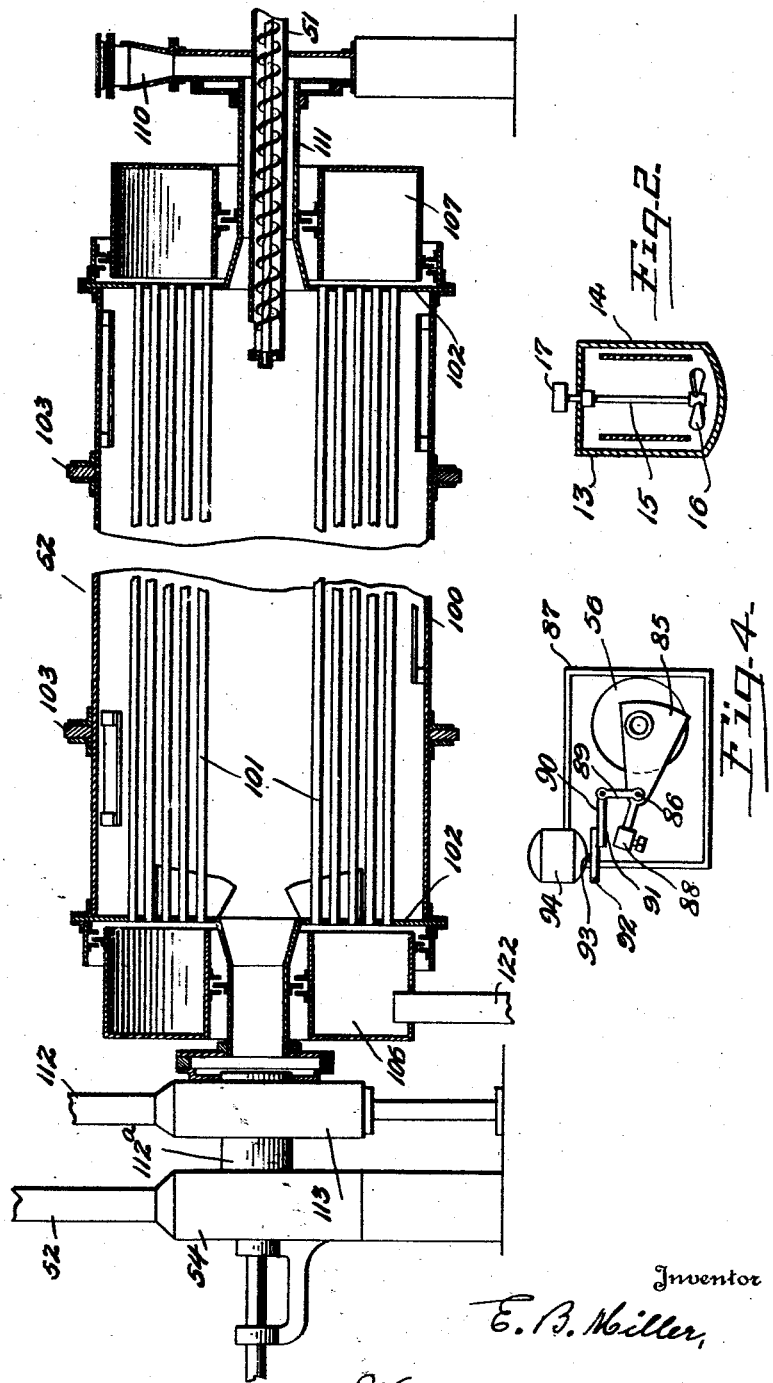

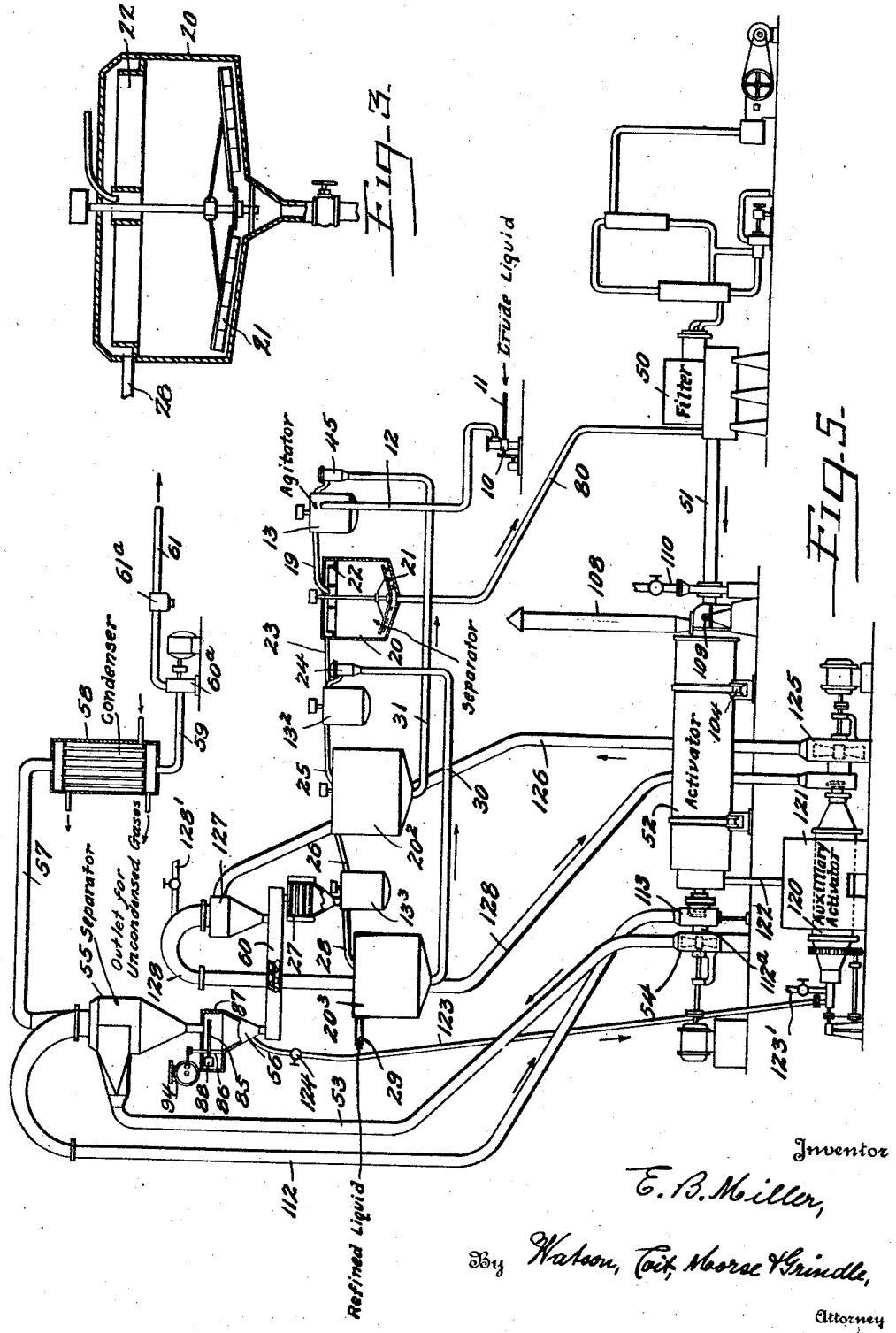

1,678,299

UNITED STATES PATENT OFFICE.

ERNEST B. MILLER, OF BALTIMORE, MARYLAND, ASSIGNOR TO THE SILICA GEL CORPORATION, OF BALTIMORE, MARYLAND, A CORPORATION OF MARYLAND.

APPARATUS FOR TREATING LIQUIDS TO REMOVE OR RECOVER SUBSTANCES THEREFROM.

Application filed June 6, 1922. Serial No. 566,365.

The present invention relates to apparatus for treating liquids to remove or recover substances therefrom.

In a prior application (Serial No. 447,857) the process of separating solutes from solutions has been disclosed, and in another application, 544,186 in the name of Walter A. Patrick and Ernest B. Miller, the method of refining oils has been described. The present invention is directed to apparatus for carrying out the processes described in said applications, one form of apparatus illustrated herein being shown in said application Serial No. 544,186.

Briefly stated, the method described in said applications consists in removing a substance from a solution by adsorbing the same in a porous material having pores of ultramicroscopic size, then liberating the substance adsorbed in the material and, if desired, using the material over again for refining more solution. The substance liberated from the pores of the adsorbing material may be recovered if desired.

The present invention comprehends apparatus for practicing the above method.

The objects and features of novelty of the invention will be apparent from the description taken in connection with the drawings, in which:

Figure 1 is a diagrammatic view illustrating in elevation one form of apparatus constructed in accordance with the present invention;

Figure 2 is a sectional elevation of one form of agitator that may be employed in the apparatus;

Figure 3 is a sectional elevation of one form of separator that may be used in the apparatus;

Figure 4 is a sectional plan view taken substantially on the line 4—4 of Figure 1, showing a feed device;

Figure 5 is a view similar to Figure 1, illustrating a modified form of apparatus; and Figure 6 is a longitudinal sectional elevation through one form of activator that may be employed.

Before describing an embodiment of the present invention, the methods which the apparatus of the present invention carry out will be briefly described, said methods having been described in the applications referred to above. According to said prior cases a solute may be adsorbed from a solution under certain conditions by means of a porous material having very fine or ultramicroscopic pores. The pores of the adsorbing material required are so small that it is a very difficult matter to accurately determine and define their size. For this purpose, however, reference may be had to the amount of water that one gram of material will adsorb when exposed to water vapor under definite condition of temperature and partial pressure of water vapor.

A liquid that wets a capillary tube will rise in the tube above the level of the surface of the liquid surrounding the same, the extent of the rise varying with the diameter of the tube. The vapor pressure of the liquid inside the tube is smaller than the vapor pressure at the level surface of the liquid outside the tube. This lowering of the vapor pressure of the liquid within the capillary tube is not appreciable until the diameter of the tube is extremely small, and the smaller the bore of the tube, the greater the decrease in vapor pressure. The amount of water adsorbed by a porous body at a given temperature and partial pressure depends both upon the size of the pores and upon the total interior volume of the pores. By determining the amount of a given fluid, water for example, which may be adsorbed by each of the porous bodies under the same condition of temperature and partial pressure, we have a means of comparing the size and volume of the pores in the two adsorbents. For example, one gram of silica gel has a total internal volume of about 0.41 cc. In other words, if we completely fill the pores in silica gel with water, the amount of water taken up will be approximately 41% of the initial weight of the gel. A sufficient percentage of the total internal volume in silica gel is made up of pores of such size that the gel will adsorb at 30° C. about 21% of its own weight of water at a partial pressure below 22 mm. Kieselguhr and boneblack under the above conditions will adsorb practically no water. Highly activated charcoal, such as cocoanut charcoal, will adsorb a relatively large amount of water. It follows, therefore, that kieselguhr and boneblack have practically no pores as small as the greater part of the pores in silica gel. On the other hand, highly activated charcoal has many small pores. It was found that materials which adsorb less than about 10% of their initial weight of water at 30° C. and at a partial pressure not exceeding 22 mm. of mercury have pores too large to be of any practical value in adsorbing solutes from solutions. The invention, therefore, includes only materials having a sufficient number of small pores so that they will adsorb not less than 10% of their initial weight of water at 30° C. and at not exceeding a partial pressure of 22 mm. of mercury.

The material preferred for practicing said methods is silica gel. This is a glass-hard material having ultra-microscopic pores and may be heated as high as 700° C. without injury. In cases where silica gel is not suitable, other hard porous gels or adsorbing material may be used, provided they have a sufficient number of small pores as defined above, i. e., activated charcoal, gels of iron oxide, tin oxide, aluminum oxide, tungsten oxide, zirconium oxide and titanium oxide.

The silica gel preferably employed as an adsorbing material in said methods and the present invention should be distinguished from the dried gelatinous precipitate obtained for example by mixing an acid and sodium silicate and then drying. This latter product does not have the porous structure required and is not suitable to adsorb solutes from solutions to any practical extent. In the preferred method of making a gel, solutions of an acid and a substance are employed of such concentrations and in such quantities that the substance will react with the acid to form a homogeneous colloidal solution. Immediate coagulation of the mass is prevented by thorough stirring at the time of mixing the ingredients. A short time after mixing the entire body of liquid sets to a homogenous, jelly-like mass and, after this is dried slowly a hard porous gel is obtained, the pores being ultra-microscopic.

The second of said applications, that is 544,186, is directed more particularly to refining oils and as illustrative of the method the steps for refining a petroleum product such as gasoline or kerosene are given.

According to said application 544,186 the liquid is refined by bringing the crude product into intimate contact with an adsorbing material having pores of a size to adsorb the substances in solution, the material preferably being in powdered condition; allowing the liquid and adsorbing material to remain in contact until the said substances are adsorbed by the material and thereafter separating the refined product from the material. It is also desired to liberate the adsorbed substances from the adsorbing material, such as silica gel, so that it may be used over again. As claimed in application Serial No. 544,186 according to one method this is accomplished by driving out the substances adsorbed in the adsorbing material by immersing the material in a liquid that has a lower surface tension at an interface with the adsorbing material than the substances adsorbed, so that the latter are replaced by the liquid; and then activating the material by driving off or liberating the liquid. For the products having higher boiling points this wash is not sufficient and in addition steam activation may be employed. According to another method the wash step is not employed and steam activation alone is used.

For the purpose of adsorbing the substances in solution from the petroleum product to be refined, any one of several methods may be used. For example, the crude liquid may be made to percolate through a tower filled with a porous adsorbing material, such as silica gel, and the refined product drawn off at the bottom of the tower. After the gel has become saturated with the substances being removed from the liquid, the crude liquid is diverted to a second similar tower, while the gel in the first tower is re-activated by suitable means.

In practice, however, it is preferred to use a different method. At present the preferred method consists in causing a stream of crude liquid to enter at one end of and to flow through a series of devices wherein the liquid and adsorbing material are successively brought into intimate contact and then separated, the material moving in one direction through said devices and the liquid flowing in the opposite direction. In the present instance the liquid enters at one end and flows by gravity successively through a series of agitators and separators containing a porous adsorbing material, such as silica gel, which is fed in continuously at the end opposite to that at which the liquid enters and by appropriate means made to move in the direction counter-current to the liquid flow. In this way a part of the objectionable constituents of the liquid being refined is removed at each stage, as the liquid flows through the agitators until finally the refining is completed in the last agitator where the liquid, which has already had most of the substances removed, comes in contact with freshly activated adsorbing material.

The present invention is for apparatus for carrying out said methods, and one form of apparatus will now be described.

Referring to Fig. 1, the liquid to be refined, such as a petroleum product, is supplied to a pump 10 by a pipe 11 and this pump through the pipe 12 feeds the petroleum product into an agitator 13. This agitator may be of any suitable construction, the function being to bring the adsorbing material and liquid into intimate contact. As shown in Figure 2, it may consist of a closed vessel 14 having a vertical shaft 15 provided with blades 16, said shaft projecting above the top of the vessel and having a pulley 17 whereby the shaft is rotated. Suitable pulverized adsorbing material, such as the silica gel previously mentioned, is supplied through the pipe 18 to the agitator so that the petroleum product and gel are thoroughly mixed. The mixture is continuously discharged through the pipe 19 to a separator 20. As shown in Figure 3, this separator the function of which is to separate the adsorbing material from the liquid, consists of a closed top vessel having a slightly conical bottom provided with an outlet. A shaft is disposed vertically in the vessel and adjacent the bottom thereof has the deflectors 21 for forcing the adsorbing material, which settles at the bottom, toward the outlet. Around the top of the vessel is a launder 22. The adsorbing material settles to the bottom of the tank and is discharged through the outlet, while the petroleum product flows into the launder and is carried by a pipe 23 to an agitator 13² and a pump 24 acts to continuously supply adsorbing material to said agitator 13². The mixture is discharged from this second agitator through a pipe 25 to a second separator 20². In the same manner as previously described, the adsorbing material settles to the bottom of this separator and the petroleum is discharged through a pipe 26 into a third agitator 13³. This agitator is supplied with freshly activated adsorbing material from a hopper 27. The mixture from the agitator is conveyed by the pipe 28 to a third separator 20³. The refined petroleum product is discharged from this separator through a pipe 29. The adsorbing material which settles to the bottom of the third separator is discharged through the outlet in the bottom and conveyed by the pipe 30 to the pump 24, previously mentioned, this pump acting to cause the flow of the adsorbing material. The adsorbing material discharged at the bottom of the second or middle separator is conveyed by a pipe 31 to a pump 45 which discharges into the pipe 18 previously mentioned. This pump 45 effects the flow in the pipe 31.

Although an apparatus having three units, each unit consisting of an agitator and a separator has been described, the invention is not limited to any particular number of units.

It will be noted that the fresh, or activated gel is fed into the system to act on the product being refined just before it is finally discharged and then its path through the apparatus is from the discharge end toward the inlet end. Thus the product fed into the first agitator 13 is mixed with adsorbing material that has already passed through a plurality of separators. This counter-flow of the adsorbing material and the petroleum product to be refined gives a very efficient action.

The adsorbing material settling in the bottom of the first separator 20 is discharged into a pipe 33. This adsorbing material has adsorbed impurities from the petroleum product and, of course, has petroleum product associated therewith. In order to make the process continuous, it is now necessary to free the adsorbing material from its adsorbed substances or "activate" it. The objectionable substances removed by the adsorption often consist of or contain complex organic compounds, usually associated with sulphur, which on heating to a sufficiently high temperature to volatilize them undergo decomposition in the gel, frequently with deposition of carbonaceous and gummy materials, difficult to remove from the gel. Satisfactory activation may be effected either by washing with hot water previous to introduction into the activator or by simply distilling the adsorbed material from the gel in a current of steam or other non-oxidizing gas, the object being to reduce the temperature necessary to get rapid distillation and thus avoid the decomposition referred to above which would occur at a higher temperature. This latter method is claimed in application Serial No. 566,664.

In all phenomena in connection with the adsorption by solids from liquids, the surface tension at the interface between the solid and the liquid is one of the most important factors determining the degree of adsorption. Since the adsorbing materials used in the present invention always contain water the surface tension at the interface of gel and water will be zero and, therefore, less than the surface tension at the interface of the porous material and other liquids. Accordingly, such porous materials, for example gels, will adsorb water in preference to any other liquid. When a gel which has been saturated with gasoline, for example, (or other liquid immiscible with water) is brought in contact with water, the latter will be adsorbed and the gasoline driven out. If the contact is maintained long enough, the displacement of gasoline by water will become complete. Furthermore, this water displacement of adsorbed oils may be accelerated by working at a higher temperature.

According to said prior application 544,186 it has been further discovered that when a gel having adsorbed in it a mixture of hydrocarbons, such as is obtained by bringing gels in contact with kerosene, is treated with water, the lighter hydrocarbons are driven out more rapidly than the heavier fractions, particularly if the water is cold.

The products associated with the gel are, therefore, recovered in fractions, which is a very desirable method inasmuch as the most objectionable constituents in unrefined gasoline, which any process of refining seeks to remove, appear to consist largely of high-boiling hydrocarbons containing sulphur. Accordingly, the lighter and more valuable fractions of the adsorbed liquid may be displaced by agitation for a limited time with cold water and the liberated substance drawn off. The heavier fractions, including the most of the objectionable sulphur compounds and other impurities, are liberated by agitation, repeatedly if necessary, with hot water. The oil recovered by cold water displacement is usually of about the same quality as the original unrefined distillate and may be re-run. The very much smaller fraction recovered by hot water agitation consists of relatively high-boiling constituents running high in sulphur and unsaturated hydrocarbons, and is suitable for a flotation or fuel oil. This fraction, regardless of its sulphur content, is unsuitable for burning as kerosene.

The product containing over 25% unsaturated hydrocarbons obtained from the pores of an adsorbing material saturated by refining a petroleum product, is new. It is free from sulphuric acid and may run as high as 75% or more unsaturated hydrocarbons. Perhaps it may best be defined as the product obtained from the pores of a porous material having pores of a size to adsorb not less than 10% of its own weight of water at 30° C. when exposed to water vapor at a partial pressure substantially not exceeding 22 mm. of mercury, which material has been used in refining a petroleum product. This new product is particularly adapted for use as a flotation oil in the flotation process of recovering metals, because it has such a high percentage of unsaturated hydrocarbons.

The gel, or other porous material employed, having been freed by water displacement of the hydrocarbons and other constituents adsorbed from the liquid being refined, is removed from the wash water, filtered, and the resulting gel cake, which now contains practically nothing but water, is run into an activator and its water content reduced to the desired extent, usually 6 to 8%, rendering the gel ready for re-use.

Referring now to the drawings, the saturated gel flows through the pipe 33 to a pump 34 which discharges into a water wash agitator 35 of the same construction as the other agitators. Cold water is supplied to this agitator through a pipe 35' so that the gel is thoroughly mixed with the water for the purpose of driving out the substances adsorbed in the refining described above. This agitator discharges through a pipe 36 into a separator 37 of the same construction as the other separators, in which the gel settles to the bottom and gasoline or other petroleum products liberated from the gel are carried by the pipe 38 to the agitator 13 so that these products are again run through the refining process. The gel which settles to the bottom of the separator 37 is carried by pipe 39 to the pump 32 which discharges into another agitator 41 supplied with hot water by the pipe 42. This agitator discharges the mixture into another separator 44. The fraction recovered by this hot water agitator 41, consisting of relatively high-boiling constituents, is discharged through the pipe 46, and may be used for fuel oil, or as a flotation oil. The gel which settles to the bottom of the tank 44 is carried by pipe 47 to pump 48 and discharged through pipe 49 to a filter press 50 of any suitable construction. In this press the surface water is filtered out and the gel cake discharged through the pipe 51 to an activator 52. This activator is illustrated in Figure 6. Briefly stated it comprises a cylindrical shell 100 with tubes 101 connecting the opposite heads 102. The shell is provided with circumferential rings 103 supported by rolls 104 (Figure 1) whereby the cylinder as a whole may be rotated. Hot gases are supplied through the pipe 122 which has communication with the chamber 106. This chamber in turn is in communication with the interior of the tubes 101 so that the hot gases pass through the tubes to the chamber 107 at the opposite end of the cylinder. This chamber is in communication with a suction fan 109 (Figure 1) having the outlet pipe 108. The adsorbing material to be activated is supplied through the conduit 51. If necessary, water, or steam, or other gas may be supplied to the interior of the activator through the inlet 110 which has communication with the centrally disposed tube 111 secured to the head 102. Usually, however, there is sufficient water in the adsorbing material supplied to the activator 52 so that the steam necessary for distilling out any of the adsorbed substances not displaced by the water wash is supplied from this source. The aims of the arrangement are to prevent ingress of air to the activator and to have any residual adsorbed substances distilled out of the pores of the adsorbing material. If heat as furnished by the hot gases alone is employed for activating the adsorbing material, there is danger of clogging the pores of the adsorbing material by the deposition of carbonaceous and gummy materials. This does not occur where air is excluded from the activator. The dried adsorbing material is discharged through the duct 112ª into the intake of the fan 54. The pipe 53 from the fan, discharges the gel or adsorbing material into a cyclone separator 55 wherein the gel settles to the bottom and is discharged into a hopper 56 from which it is fed by a screw conveyor 60 to the hopper 87 which discharges into agitator 13ª thereby returning the gel into the refining cycle. If desired the gel may be cooled and for this purpose the hopper 87 has its upper portion constructed with cooling surfaces. The vapors separated out by the cyclone separator 55 may be discharged into the atmosphere, or, if it is desired to recover any of the vapors they pass through a pipe 57 to a condenser 58. The condensate and gel not separated by the cyclone separator 55 are drained through a pipe 59 to a pump 60ª which discharges through a pipe 61 into the water wash agitator 41.

It is desirable to prevent the passage of vapors through the lower end of the cyclone separator 55. This may be accomplished in any suitable manner. As shown, a novel form of feeding device is employed. Referring to Figure 4, this device comprises a plate 85 carried by an oscillating shaft 86 disposed in the box 87, having a hopper bottom 56. The plate 85 is disposed horizontally and is counterbalanced by the weight 88. As shown in Figure 1, the plate is disposed a slight distance below the lower end of the outlet of the cyclone separator 55. The plate is oscillated back and forth in a horizontal plane in any suitable manner, but the extent of oscillation is not sufficient to open up the lower end of the cyclone separator at any time. For the purpose of oscillating the shaft 86 any suitable mechanism may be employed. As shown, an arm 89 is secured to the upper end of the shaft and outside the box 37. This arm is connected by a link 90 to a crank pin 91 on the crank disc 92, the latter being carried by the armature shaft 93 of the motor 94. In operation, the continual oscillation of the plate 85 effects a uniform feed of the adsorbing material into the hopper 56 but at no time permits passage of vapors.

If desired the discharge from the cyclone separator 55, in addition to being connected to the condenser 58 may have a return pipe 112 for conveying vapors to a point adjacent the inlet of the fan 54, as shown at 113. In this manner the vapors are used over and over again and a greater volume of vapors is supplied to the fan so that the velocity in the pipe 53 is sufficient to raise the adsorbing material therewith. It is to be understood that the pipes 53 and 112 are thoroughly lagged.

In refining some liquids it may happen, after the adsorbing material has made many cycles through the apparatus, that its adsorbing efficiency will be decreased because of the deposition of carbonaceous or gummy materials thereon. Where this is liable to occur an auxiliary activator may be employed to drive off these substances from the adsorbing material.

As shown, this auxiliary activator, in the form of the drum 120, is disposed in the furnace 121 which supplies hot gases through the pipe 122 to the main activator 52. Adsorbing material taken from the hopper 56 or other point may be carried through pipe 123 to the inlet end of the activator 120. This pipe may be supplied with a valve or damper 124 to control the flow of adsorbing material therein. At its discharge end the auxiliary activator 120 has a blower 125 discharging through pipe 126 into a cyclone separator 127. The adsorbing material discharged through this pipe 126 is separated from the air and gases in the cyclone separator 127 and discharged into the cycle at any suitable point, as the worm conveyor 60. The vapors from the top of the cyclone 127 are returned by pipe 128 to the activator 120 at a point adjacent the inlet of the blower 125. In this manner these vapors are used over and over to raise the activated adsorbing material. A small quantity of the vapors may be exhausted through pipe 128′, and the loss made up by air supplied through pipe 123′ at the inlet end of the activator. In this manner oxygen is obtained to burn the carbonaceous deposits associated with the material. It will be understood that the quantity of adsorbing material supplied to this auxiliary activator may be regulated by valve 124. If desired, all of the adsorbing material from hopper 56 may be passed at intervals through the auxiliary activator 120.

Liquids having relatively low boiling points, such as gasoline, kerosene and benzol may be refined with or without the step of washing the adsorbing material to displace the adsorbed substances as described above. Other liquids, such as petroleum products having higher boiling points are preferably refined without the wash step, the activation being effected by a hot non-oxidizing gas such as steam, carbon dioxide, nitrogen, etc. An apparatus for practicing this method is shown in Figure 5.

The apparatus is like that shown by Figure 1 except that the parts for the washing step are omitted. Thus the adsorbing material separated out from the separator 20 is conveyed directly to the filter 50 by means such as pipe 80 and this filter discharges into the activator 52. A non-oxidizing gas such as steam may be supplied to the activator through the gas inlet 110, it being the object in activating most materials, as in the apparatus shown in Figure 1, to exclude air from the activator. The steam supplied through pipe 110 distills out the substances adsorbed in the pores of the adsorbing material and at the same time prevents the ingress of air. If hot gases from furnace 121 alone were employed for activating and air were admitted to the activator, the volatile hydrocarbons liberated by the activation in the case of gasolines, benzols and kerosene would be liable to combine with the air in the discharge pipe from the activator or in the separator 55 causing explosion. This is prevented by excluding the air from the activator. It will be understood that hot gases may be supplied from the furnace 121 to heat the activator if necessary.

If desired an auxiliary activator 120 like that described in connection with Figure 1 may be employed. It may be arranged in the same location as shown in Figure 1 and therefore needs no further description.

It will be understood that the term "vapor" throughout the specification and claims includes gases as well as vapors.

Although two types of apparatus for practicing the invention have been described in detail it will be understood that the invention is not limited to these constructions but includes modifications and changes which come within the scope of the appended claims.

Having thus described the invention what is claimed as new and desired to be secured by Letters Patent is:

1. In a cyclic apparatus for refining liquids, in combination, an agitating device adapted to contain a hard porous adsorbent material, means to supply liquid to be refined to said device, a separator connected to said agitating device wherein the liquid and the material are separated, an activator, means to convey the separated material from said separator to said activator, a second separator to separate the adsorbing material and vapors after their discharge from said activator, and means to return the activated material from said last mentioned separating means to said agitating device.

2. In a cyclic apparatus for refining liquids, in combination, an agitating device adapted to contain a hard porous adsorbent material, means to supply liquid to be refined to said device, a separator connected to said agitating device wherein the liquid and the material are separated, an activator, means to convey the separated material from said separator to said activator, means to separate the adsorbing material and vapors discharged from said activator, means to return the activated material from said last mentioned separating means to said agitating device, and means to return a portion of said separated vapors to the activator.

3. In a cyclic apparatus for refining liquids, in combination, an agitating device adapted to contain a hard porous adsorbent material, means to supply liquid to be refined to said device, a separator connected to said agitating device wherein the liquid and the material are separated, an activator, means to convey the separated material from said separator to said activator, means to separate the adsorbing material and vapors discharged from said activator, means to return the activated material from said last mentioned separating means to said agitating device, means to return a portion of the separated vapors to the activator, a condenser, and means to deliver the remainder of said separated vapors to said condenser.

4. In a cyclic apparatus for refining liquids, in combination, a series of agitators wherein the liquid to be refined is brought into intimate contact with a hard porous adsorbing material, a separator connected to each agitating device for separating the liquid from the material, a conduit connecting the liquid discharge of each separator to the preceeding agitator in the series, means for conveying the material separated in each separator to the following agitator of the series, whereby a countercurrent flow of the material and liquid is secured, means to supply crude liquid to be refined to the last agitator in said series, an activator, means to convey the material separated out in the last separator to said activator, and means to return the activated adsorbent material from said activator to the first agitator in said series.

5. In a cyclic apparatus for refining liquids, in combination, an agitating device adapted to contain a hard porous adsorbing material, means to supply liquid to be refined to said device, whereby substances in solution in the liquid are adsorbed, means to separate the material from the liquid, an activator to which the separated material is delivered, a second separator to separate the adsorbing material and vapors after their discharge from the activator, an auxiliary activator, means to deliver the activated adsorbing material to said auxiliary activator, and means to deliver the activated adsorbing material from said auxiliary activator to said agitating device.

6. In a cyclic apparatus for refining liquids, in combination, an agitating device adapted to contain a hard porous adsorbing material, means to supply liquid to be refined to said device, whereby substances in solution in the liquid are adsorbed, means to separate the material from the liquid, an activator to which the separated material is delivered, means to separate the adsorbing material and vapors discharged from the activator, an auxilary activator, means to deliver the activated adsorbing material to said auxiliary activator, a separator connected to said auxiliary activator for separating the material and vapors discharged therefrom, means to deliver the activated adsorbing material from said last mentioned separator to said agitating device, and means to return a portion of said separated vapors to said auxiliary activator.

7. In a cyclic apparatus for refining liquids, in combination, an agitating device adapted to contain a hard porous adsorbing material, means to supply liquid to be refined to said device, means for separating the material and liquid discharged from said device, an activator, means to deliver the separated material from said separator to said activator, a separator adapted to continuously separate the vapors and material discharged from said activator, means to return a portion of said separated vapors to said activator, an auxiliary activator to which the material separated in said continuous separator is delivered, a second continuous separator adapted to separate the vapors and material discharged from said auxiliary activator, means to return a portion of said last mentioned separated vapors to said auxiliary activator, and means to deliver the activated material from said last mentioned separator to said agitating device.

8. In a cyclic apparatus for refining liquids, in combination, an agitating device adapted to contain a hard porous adsorbing material, means to supply liquid to be refined to said agitating device, means for separating the material and liquid discharged from said agitating device, means to bring the separated material into intimate contact with a liquid which has a lower surface tension toward the material than toward the substances adsorbed therein, whereby adsorbed substances are displaced by the last mentioned liquid, means for separating said material and said last mentioned liquid, means to bring the separated material into contact with displacing liquid at a higher temperature than the temperature of the first mentioned displacing liquid, means to separate the material from the last mentioned liquid, means to drive off the liquid from the pores of the material, and means to return the activitated material to said agitating device.

9. An endless-cycle apparatus for refining liquids, including in combination, an agitator adapted to contain a solid adsorbent material, means to supply liquid to be refined to said agitator, means to revivify the spent adsorbent material, means to separate the adsorbent and said liquid and conduct the adsorbent to said revivifying means, said revivifying means including an agitator and a heat activator, means to conduct the separated adsorbent and a second liquid to the last mentioned agitator, means to separate said second liquid and said adsorbent material, means to conduct said separated adsorbent material to said heat activator and means to return the revivified adsorbent material to said first agitator.

10. In an endless-cycle apparatus for refining liquids, means to treat a liquid with a solid adsorbent to adsorb dissolved substances therefrom, means to revivify the spent material and means to return it to the first means, said revivifying means comprising an agitator into which the spent adsorbing material and a liquid are delivered, means to separate said last mentioned liquid and adsorbent, a heat activator, and means to convey the adsorbent from said separator to said heat activator.

11. The apparatus according to claim 10 wherein the heat activator comprises two units, one being at a higher temperature than the other.

12. In an endless-cycle apparatus for refining liquids, means to treat a liquid with a solid adsorbent to adsorb dissolved substances therefrom, means to revivify the material and means to return it to the first means, said revivifying means comprising an agitator into which the spent adsorbent and a second liquid are delivered, means to separate the second liquid and adsorbent, a second agitator, means to supply said second agitator with the separated adsorbent and liquid at a higher temperature than for the first agitator, means to separate said adsorbent from the last mentioned liquid, a heat activator, and means to convey the adsorbent from said last mentioned separating means to said heat activator.

13. In an endless-cycle apparatus for refining liquids, in combination, means to treat a liquid with a solid adsorbent material to adsorb dissolved substances therefrom, means to separate and revivify spent material including an activator, a separator, a conduit connecting said activator and separator, means to effect a flow in said conduit of said material and the gases and vapors discharged from the activator, and a conduit connecting the gas outlet of said separator and the activator, whereby some of the gases are re-circulated to obtain a sufficient gas velocity in said first conduit to transport said material.

In testimony whereof I hereunto affix my signature.

ERNEST B. MILLER.